United States Patent
Pratt et al.

(10) Patent No.: US 10,619,649 B2
(45) Date of Patent: Apr. 14, 2020

(54) BELLCRANK ASSEMBLY FOR GAS TURBINE ENGINE AND METHOD

(71) Applicant: United Technologies Corporation, Farmington, CT (US)

(72) Inventors: William S. Pratt, West Hartford, CT (US); John C. DiTomasso, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 371 days.

(21) Appl. No.: 15/478,899

(22) Filed: Apr. 4, 2017

(65) Prior Publication Data

US 2018/0283398 A1    Oct. 4, 2018

(51) Int. Cl.

| | | |
|---|---|---|
| *F04D 29/56* | (2006.01) | |
| *F02C 3/04* | (2006.01) | |
| *F04D 29/54* | (2006.01) | |
| *F01D 17/16* | (2006.01) | |
| *F02C 9/20* | (2006.01) | |
| *F01D 9/04* | (2006.01) | |

(52) U.S. Cl.
CPC .......... *F04D 29/563* (2013.01); *F01D 9/042* (2013.01); *F01D 17/16* (2013.01); *F01D 17/162* (2013.01); *F02C 3/04* (2013.01); *F02C 9/20* (2013.01); *F04D 29/542* (2013.01); *F05D 2220/32* (2013.01); *F05D 2240/35* (2013.01); *F05D 2260/50* (2013.01)

(58) Field of Classification Search
CPC ........ F04D 29/563; F04D 29/542; F02C 9/20; F02C 3/04; F01D 17/162; F01D 17/16; F01D 9/042; F05D 2240/35; F05D 2220/32; F05D 2260/50

See application file for complete search history.

(56) References Cited

U.S. PATENT DOCUMENTS

| | | | | |
|---|---|---|---|---|
| 2,842,305 A | * | 7/1958 | Eckenfels | F01D 17/162 415/147 |
| 3,030,072 A | * | 4/1962 | Boyd | F03B 3/183 415/164 |
| 3,263,906 A | * | 8/1966 | Ward | F04D 19/002 137/512.1 |
| 3,303,992 A | * | 2/1967 | Johnson | F01D 17/162 415/149.4 |

(Continued)

FOREIGN PATENT DOCUMENTS

EP    1387041 A2    2/2004

OTHER PUBLICATIONS

Extended European Search Report regarding related EP App. No. 18154974.2; dated Jul. 18, 2018; 8 pgs.

*Primary Examiner* — Dwayne J White
*Assistant Examiner* — Adam W Brown
(74) *Attorney, Agent, or Firm* — Cantor Colburn LLP

(57) ABSTRACT

A bellcrank assembly for variable vane assembly of a gas turbine engine includes a first bellcrank segment. Also included is a second bellcrank segment. Further included is a bolt extending through respective interior barrels defined by the first and second bellcrank segments to couple the first and second bellcrank segments to each other. Yet further included is a torque frame wall defining an aperture, the bolt extending through the aperture.

18 Claims, 3 Drawing Sheets

(56) References Cited

U.S. PATENT DOCUMENTS

| | | | | |
|---|---|---|---|---|
| 3,639,072 | A | * | 2/1972 | Munkstrand ............ F03B 3/183 |
| | | | | 415/9 |
| 4,037,986 | A | * | 7/1977 | Chilman ................. B64C 11/40 |
| | | | | 416/46 |
| 4,139,329 | A | * | 2/1979 | Korta ..................... F01D 17/162 |
| | | | | 415/161 |
| 4,244,181 | A | | 1/1981 | Wiher et al. |
| 4,292,802 | A | * | 10/1981 | Snow ...................... F02K 3/075 |
| | | | | 60/204 |
| 4,299,534 | A | * | 11/1981 | Yamane .................. F03B 3/183 |
| | | | | 415/165 |
| 4,363,600 | A | * | 12/1982 | Thebert ................. F01D 17/162 |
| | | | | 415/140 |
| 4,490,622 | A | | 12/1984 | Osborn |
| 5,281,087 | A | | 1/1994 | Hines |
| 6,006,879 | A | * | 12/1999 | Sudau ............... F16F 15/13157 |
| | | | | 192/207 |
| 6,802,692 | B2 | * | 10/2004 | Bouru ..................... F01D 17/16 |
| | | | | 403/286 |
| 7,426,911 | B2 | * | 9/2008 | Liang ........................ F01L 9/04 |
| | | | | 123/90.11 |
| 8,172,517 | B2 | * | 5/2012 | Lighty .................. F01D 17/162 |
| | | | | 415/156 |
| 8,230,683 | B2 | | 7/2012 | Fledersbacher et al. |
| 8,534,990 | B2 | * | 9/2013 | Duong .................. F01D 17/165 |
| | | | | 415/119 |
| 2012/0230814 | A1 | | 9/2012 | Fledersbacher et al. |
| 2015/0135868 | A1 | | 5/2015 | Nikolaev et al. |
| 2016/0319693 | A1 | | 11/2016 | Ward |

\* cited by examiner

BELLCRANK ASSEMBLY FOR GAS TURBINE ENGINE AND METHOD

STATEMENT OF FEDERAL SUPPORT

This invention was made with Government support under Contract No. FA8650-09-D-2923-0021 awarded by the United States Air Force. The Government has certain rights in the invention.

BACKGROUND

Exemplary embodiments pertain to the art of gas turbine engines. Recent architecture trends in gas turbine technology, such as on-leading-edge (OLE) variable vanes, longer compressors, and an increased number of variable vane stages, all help to increase thrust specific fuel consumption (TSFC), compressor efficiency and stall margin. However, these architectural changes also increase the loading that the stator vane actuator receives during a surge event. It also increases the loading difference between normal operation and a surge event. Designing an actuation system capable of withstanding such loads is weight and cost prohibitive.

Accordingly, it would be desirable to absorb energy of a surge event while still being able size the assembly for normal operation loads.

BRIEF DESCRIPTION

Disclosed is a bellcrank assembly for variable vane assembly of a gas turbine engine includes a first bellcrank segment. Also included is a second bellcrank segment. Further included is a bolt extending through respective interior barrels defined by the first and second bellcrank segments to couple the first and second bellcrank segments to each other. Yet further included is a torque frame wall defining an aperture, the bolt extending through the aperture.

In addition to one or more of the features described above, or as an alternative to any of the foregoing embodiments, the torque frame wall may be located proximate a longitudinal midpoint of the bellcrank assembly.

In addition to one or more of the features described above, or as an alternative to any of the foregoing embodiments, included may be a torsion spring having an end including a keyed geometry, the end engaged with one of the first and second bellcrank segments.

In addition to one or more of the features described above, or as an alternative to any of the foregoing embodiments, the keyed geometry may include at least one protrusion received within a recess defined by at least one of the first and second bellcrank segments.

In addition to one or more of the features described above, or as an alternative to any of the foregoing embodiments, the torsion spring may have a spring coefficient sufficient to maintain a rigid connection between the first and second bellcrank segments during a normal operating condition of the compressor, the torsion spring allowing relative rotation of the first bellcrank segment and the second bellcrank segment during a surge condition.

In addition to one or more of the features described above, or as an alternative to any of the foregoing embodiments, included may be a shear bushing disposed within the aperture defined by the torque frame wall.

In addition to one or more of the features described above, or as an alternative to any of the foregoing embodiments, the interior barrels may extend along a longitudinal axis of the bellcrank assembly.

Also disclosed is a gas turbine engine including a compressor section. Also included is a combustor fluidly coupled to the compressor section via a primary flowpath. Further included is a turbine section fluidly coupled to the combustor section via the primary flowpath. Yet further included is a plurality of variable vanes disposed within the compressor section. Also included is a bellcrank assembly operatively coupled to the plurality of variable vanes, articulation of the bellcrank assembly causing rotation of the plurality of variable vanes. The bellcrank assembly includes a first bellcrank segment having a first bellcrank arm for receiving an input rotation from an actuation mechanism, the first bellcrank segment defining a first bellcrank barrel. The bellcrank assembly also includes a second bellcrank segment having a second bellcrank arm for outputting rotation to the plurality of variable vanes, the second bellcrank segment defining a second bellcrank barrel. The bellcrank assembly further includes a bolt extending through the first and second bellcrank barrels to couple the first and second bellcrank segments to each other. The bellcrank assembly yet further includes a torsion spring having an end including a keyed geometry, the end engaged with one of the first and second bellcrank segments.

In addition to one or more of the features described above, or as an alternative to any of the foregoing embodiments, included may be a torque frame defining an aperture, the bolt extending through the aperture.

In addition to one or more of the features described above, or as an alternative to any of the foregoing embodiments, the torque frame wall may be located proximate a longitudinal midpoint of the bellcrank assembly.

In addition to one or more of the features described above, or as an alternative to any of the foregoing embodiments, included may be a shear bushing disposed within the aperture defined by the torque frame wall.

In addition to one or more of the features described above, or as an alternative to any of the foregoing embodiments, the keyed geometry may include at least one protrusion received within a recess defined by at least one of the first and second bellcrank segments.

In addition to one or more of the features described above, or as an alternative to any of the foregoing embodiments, the torsion spring may have a spring coefficient sufficient to maintain a rigid connection between the first and second bellcrank segments during a normal operating condition of the compressor, the torsion spring allowing relative rotation of the first bellcrank segment and the second bellcrank segment during a surge condition.

In addition to one or more of the features described above, or as an alternative to any of the foregoing embodiments, the first and second bellcrank barrels may extend along a longitudinal axis of the bellcrank assembly.

Further disclosed is a method of surge protection for a variable vane assembly in a gas turbine engine is provided. The method includes maintaining a rigid connection between a first bellcrank segment and a second bellcrank segment during a normal operating condition of the compressor, the first and second bellcrank segments being mechanically coupled to each other. The method also includes allowing relative rotation of the first bellcrank segment and the second bellcrank segment to each other during a surge condition. The method further includes absorbing mechanical energy with a torsion spring engaged with at least one of the first and second bellcrank segments during relative rotation of the first bellcrank segment and the second bellcrank segment during.

In addition to one or more of the features described above, or as an alternative to any of the foregoing embodiments, the rigid connection between the first and second bellcrank segments may be maintained with a bolt extending through a first bellcrank barrel and a second bellcrank barrel defined respectively by the first bellcrank segment and the second bellcrank segment.

In addition to one or more of the features described above, or as an alternative to any of the foregoing embodiments, the method may include preloading at least one of the first and second bellcrank segments with a preload torque applied by a keyed geometry of the torsion spring and at least one of the first and second bellcrank segments.

In addition to one or more of the features described above, or as an alternative to any of the foregoing embodiments, the method may include defining a mounting location of the first and second bellcrank segments with a torque frame wall.

In addition to one or more of the features described above, or as an alternative to any of the foregoing embodiments, the torque frame wall may be a single wall.

In addition to one or more of the features described above, or as an alternative to any of the foregoing embodiments, the method may include defining a rotational path with a shear bushing disposed in an aperture of the torque frame wall.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
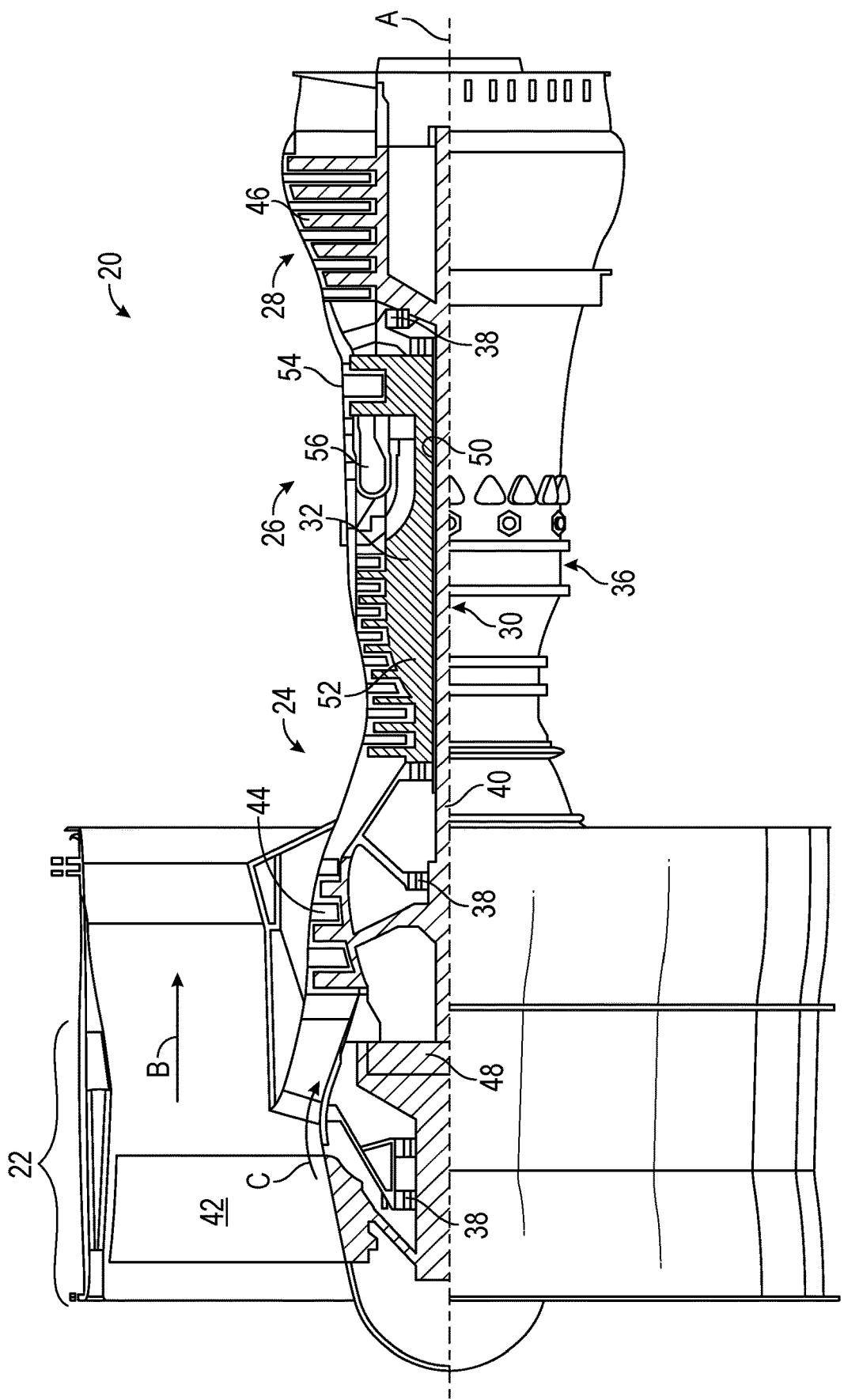
FIG. 1 is a side, partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 feet (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

The compressor section 24 includes a plurality of variable vanes. The variable vanes are positioned on a sync ring (not shown) and the orientation of the variable vanes is controlled by an actuator system. In particular, multiple vanes are disposed circumferentially about the compressor section 24 along, and operatively coupled to, a sync ring that synchronizes articulation of the variable vanes.

Figure 2:
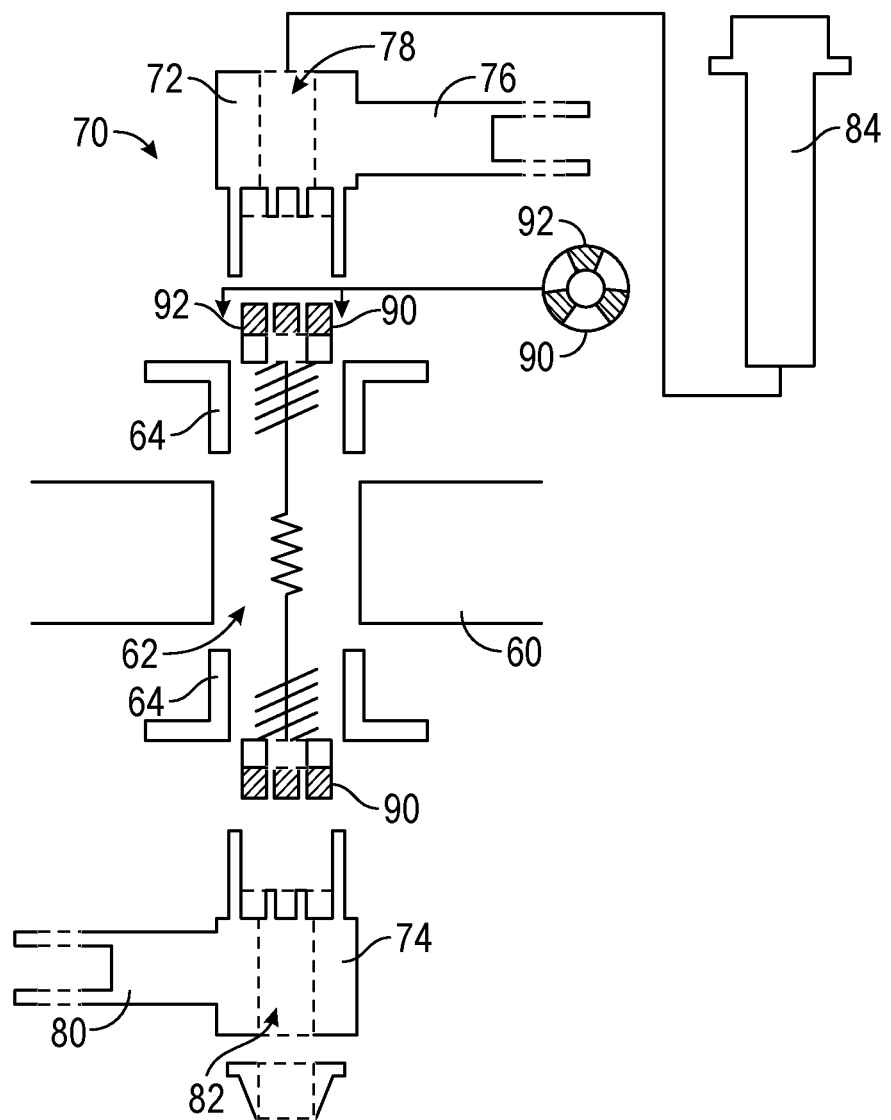
FIG. 2 is a disassembled view of a bellcrank assembly of the gas turbine engine.

Referring to FIG. 2, a bellcrank assembly 70 is illustrated in a disassembled condition. A torque frame 60 connects the sync ring to an actuation mechanism positioned outside an engine case via a torque tube or the like. The torque tube protrudes through the engine case and transfers rotational motion from an actuator output to a torque frame 60 input. The torque frame 60 then transfers the motion from the input to the sync ring. The rotation of the sync ring adjusts the orientation of all the variable vanes connected to the sync ring simultaneously. The torque frame 60 is a single wall in some embodiments.

The torque frame 60 is connected to a drive ring via the bellcrank assembly 70. The bell crank assembly 70 transfers rotation of a torque frame input to the connected drive ring and vice versa. The drive ring is a ring that is supported in the gas turbine engine 20 via multiple support arms. In the illustrated embodiment, the torque frame 60 is a single wall that is located proximate a longitudinal midpoint of the bellcrank assembly 70. It is to be appreciated that multiple stacked or spaced walls may be present in other embodiments and may be located away from the longitudinal midpoint of the bellcrank assembly 70. The torque frame 60 defines an aperture 62 for receiving the bellcrank assembly 70. A bushing 64, such as a shear bushing, is disposed at least partially within the aperture 62.

Rather than a single, unitary bellcrank, the bellcrank assembly 70 includes a first bellcrank segment 72 and a second bellcrank segment 74 that are separate structural components operatively coupled to each other. The first bellcrank segment 72 includes a first bellcrank arm 76 and defines a first bellcrank barrel 78 extending in a longitudinal direction of the bellcrank assembly 70. The second bellcrank segment 74 includes a second bellcrank arm 80 and defines a second bellcrank barrel 82 extending in a longitudinal direction of the bellcrank assembly 70. In some embodiments, the first bellcrank segment 72 and the second bellcrank segment 74 are halves of the overall bellcrank assembly 70. It is to be understood that one segment may be slightly longer, or larger overall, than the other segment. Furthermore, it is contemplated that the bellcrank assembly 70 comprises more than two bellcrank segments in some embodiments. The bellcrank segments 72, 74 are coupled to each other with a mechanical fastener 84, such as a bolt or the like, that extends through the first and second bellcrank barrels 78, 82 to retain the bellcrank segments 72, 74 in an axial direction of the bellcrank assembly 70.

The bellcrank assembly 70 receives an input at the first or second bellcrank arm 76, 80 and an output is provided at the other bellcrank arm to facilitate adjustment of the variable vanes. Due to the bellcrank assembly 70 comprising multiple segments, such as the first and second bellcrank segments 72, 74, the bellcrank segments 72, 74 may rotate relative to each other. During a normal operating mode of the compressor 24, a substantially rigid structure of the bellcrank assembly 70 is desired, but relative motion between the bellcrank segments 72, 74 is facilitated during a surge event experienced by the compressor, as described herein. A torsion spring 90 is engaged with at least one of the bellcrank segments 72, 74 to control relative rotation of the bellcrank segments 72, 74. The torsion spring 90 has an end with a keyed geometry 92 that engages a corresponding geometry in one of the bellcrank barrels 78, 82. For example, the keyed geometry may include at least one protrusion that is received within a recess defined by one of the bellcrank segments 72, 74 or vice versa.

The torsion spring 90 has a spring coefficient sufficient to maintain a rigid connection between the first and second bellcrank segments 72, 74 during a normal operating condition of the compressor 24, but allowing relative rotation of the first bellcrank segment 72 and the second bellcrank segment 74 during a compressor surge event (i.e., surge condition). The wall defining the bellcrank barrel(s) 78, 82 is machined to facilitate locking by the torsion spring 90 engagement that is required to hold the bellcrank arms 76, 80 at a desired relative angle. The bellcrank segments 72, 74 are pre-twisted to an angle that applies a preload upon engagement of the torsion spring 90. During a surge event, the bellcrank arm that receives the load due to the surge event will rotate relative to the other bellcrank arm, and the torsion spring 90 will begin to absorb some of the input mechanical energy. During normal operation torque, the preloaded torque will be larger than the normal operation torque, such that the bellcrank arms 76, 80 will remain rigid with respect to each other. However, during a surge event, the bellcrank arm that undergoes rotation will theoretically rotate as much as possible to allow maximum stator vane travel, but to avoid clashing of the vane with an adjacent vane.

Figure 3:
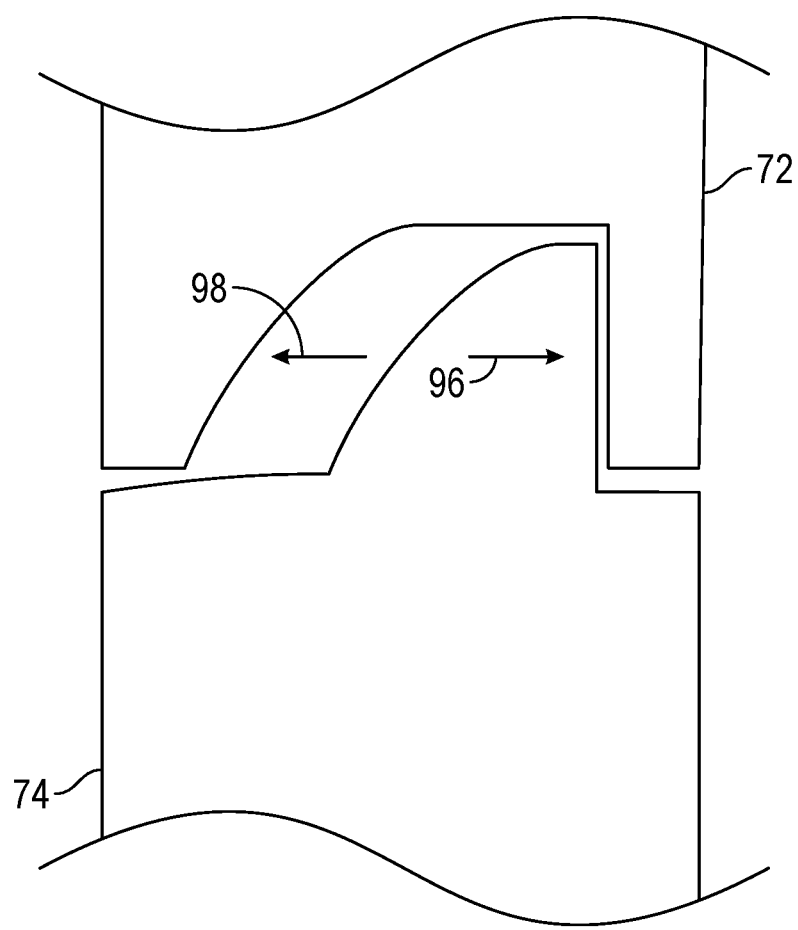
FIG. 3 is an elevational view of bellcrank barrels of the bellcrank assembly.

FIG. 3 shows the interface between the bellcrank barrels 78, 82 and the interface geometry. The preload torque 96 due to the torsion spring 90 positioning maintains the rigid structure of the bellcrank segments 72, 74, but allows movement 98 due to a surge event.

The embodiments of the bellcrank assembly 70 described herein allow for a stator vane actuation system to be sized for normal operation, while still being capable of withstanding surge loading. The embodiments also simplify manufacturing of the torque frame 60, because the structure would be simplified to a single plate rather than a hollowed out frame that is required for torque boxes.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bellcrank assembly for variable vane assembly of a gas turbine engine, the bellcrank assembly comprising:
   a first bellcrank segment;
   a second bellcrank segment;
   a bolt extending through respective interior barrels defined by the first and second bellcrank segments to couple the first and second bellcrank segments to each other within the axial direction;
   a torsion spring having an end including a keyed geometry, the end engaged with one of the first and second bellcrank segments, the torsion spring extending from the first bell crank segment to the second bell crank segment, wherein the torsion spring has a spring coefficient sufficient to maintain a rigid connection between the first and second bellcrank segments during a normal operating condition of the compressor, the torsion spring allowing relative rotation of the first bellcrank segment and the second bellcrank segment during a surge condition; and
   a torque frame wall defining an aperture, the bolt and torsion spring extending through the aperture.

2. The bellcrank assembly of claim 1, wherein the torque frame is a single plate or multiple stacked plates.

3. The bellcrank assembly of claim 2, wherein the torque frame wall is located proximate a longitudinal midpoint of the bellcrank assembly.

4. The bellcrank assembly of claim 3, wherein the keyed geometry comprises at least one protrusion received within a recess defined by at least one of the first and second bellcrank segments.

5. The bellcrank assembly of claim 3, further comprising a shear bushing disposed within the aperture defined by the torque frame wall.

6. The bellcrank assembly of claim 1, wherein the interior barrels extend along a longitudinal axis of the bellcrank assembly.

7. A gas turbine engine comprising:
   a compressor section;
   a combustor fluidly coupled to the compressor section via a primary flowpath;
   a turbine section fluidly coupled to the combustor section via the primary flowpath;
   a plurality of variable vanes disposed within the compressor section; and
   a bellcrank assembly operatively coupled to the plurality of variable vanes, articulation of the bellcrank assembly causing rotation of the plurality of variable vanes, the bellcrank assembly comprising:
      a first bellcrank segment having a first bellcrank arm for receiving an input rotation from an actuation mechanism, the first bellcrank segment defining a first bellcrank barrel;
      a second bellcrank segment having a second bellcrank arm for outputting rotation to the plurality of variable vanes, the second bellcrank segment defining a second bellcrank barrel;
      a bolt extending through the first and second bellcrank barrels to couple the first and second bellcrank segments to each other within the axial direction;
      a torsion spring having an end including a keyed geometry, the end engaged with one of the first and second bellcrank segments, the torsion spring extending from the first bell crank segment to the second bellcrank segment, wherein the torsion spring has a spring coefficient sufficient to maintain a rigid connection between the first and second bellcrank segments during a normal operating condition of the compressor, the torsion spring allowing relative rotation of the first bellcrank segment and the second bellcrank segment during a surge condition.

8. The gas turbine engine of claim 7, further comprising a torque frame defining an aperture, the bolt and the spring extending through the aperture, wherein the torque frame is a single plate or multiple stacked plates.

9. The gas turbine engine of claim 8, wherein the torque frame wall is located proximate a longitudinal midpoint of the bellcrank assembly.

10. The gas turbine engine of claim 8, further comprising a shear bushing disposed within the aperture defined by the torque frame wall.

11. The gas turbine engine of claim 7, wherein the keyed geometry comprises at least one protrusion received within a recess defined by at least one of the first and second bellcrank segments.

12. The gas turbine engine of claim 7, wherein the first and second bellcrank barrels extend along a longitudinal axis of the bellcrank assembly.

13. A method of surge protection for a variable vane assembly in a gas turbine engine comprising:
   maintaining a rigid connection between a first bellcrank segment and a second bellcrank segment during a normal operating condition of the compressor using a torsion spring, the first and second bellcrank segments being mechanically coupled to each other through the torsion spring;
   allowing relative rotation of the first bellcrank segment and the second bellcrank segment to each other during a surge condition; and
   absorbing mechanical energy with the torsion spring engaged with at least one of the first and second bellcrank segments during relative rotation of the first bellcrank segment and the second bellcrank segment during a surge event.

14. The method of claim 13, wherein the first and second bellcrank segments is maintained within the axial direction with a bolt extending through a first bellcrank barrel and a second bellcrank barrel defined respectively by the first bellcrank segment and the second bellcrank segment.

15. The method of claim 13, further comprising preloading at least one of the first and second bellcrank segments with a preload torque applied by a keyed geometry of the torsion spring and at least one of the first and second bellcrank segments.

16. The method of claim 13, further comprising defining a mounting location of the first and second bellcrank segments with a torque frame wall.

17. The method of claim 16, wherein the torque frame wall is a single plate or multiple stacked plates.

18. The method of claim 16, further comprising defining a rotational path with a shear bushing disposed in an aperture of the torque frame wall.

* * * * *